(12) United States Patent
Kwon et al.

(10) Patent No.: US 8,855,702 B2
(45) Date of Patent: Oct. 7, 2014

(54) COMMUNICATION SYSTEM FOR INTER-CELL COORDINATION

(71) Applicant: Samsung Electronics Co., Ltd., Suwon-si (KR)

(72) Inventors: Tae Soo Kwon, Hwaseong-si (KR); Won Jong Noh, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/858,154

(22) Filed: Apr. 8, 2013

(65) Prior Publication Data

US 2013/0237274 A1   Sep. 12, 2013

Related U.S. Application Data

(62) Division of application No. 12/833,908, filed on Jul. 9, 2010, now Pat. No. 8,437,795.

(30) Foreign Application Priority Data

Oct. 23, 2009 (KR) .......................... 10-2009-0101222

(51) Int. Cl.
| | |
|---|---|
| *H04B 7/00* | (2006.01) |
| *H04W 52/42* | (2009.01) |
| *H04W 52/24* | (2009.01) |
| *H04W 52/16* | (2009.01) |
| *H04W 52/08* | (2009.01) |

(52) U.S. Cl.
CPC .............. *H04W 52/16* (2013.01); *H04W 52/42* (2013.01); *H04W 52/241* (2013.01); *H04W 52/08* (2013.01)
USPC ............... 455/522; 455/69; 455/70; 455/444; 455/449; 455/445; 370/310; 370/315; 370/316; 370/317; 370/318

(58) Field of Classification Search
USPC ..................... 455/522, 69–70, 443–444, 449; 370/310–320
See application file for complete search history.

(56) References Cited

U.S. PATENT DOCUMENTS

| | | | |
|---|---|---|---|
| 2008/0146154 A1 | 6/2008 | Claussen et al. | |
| 2008/0261602 A1 | 10/2008 | Livneh | |

(Continued)

FOREIGN PATENT DOCUMENTS

| | | | |
|---|---|---|---|
| JP | 2000-287250 A | 10/2000 | |
| JP | 2007-129405 A | 5/2007 | |

(Continued)

OTHER PUBLICATIONS

Japanese Office Action issued Mar. 11, 2014 in counterpart Japanese Patent Application No. 2012-535104 (7 pages, in Japanese with English Translation).

*Primary Examiner* — Fayyaz Alam
(74) *Attorney, Agent, or Firm* — NSIP Law

(57) ABSTRACT

System and methods for intercell coordination are provided. The system includes a macro terminal and a macro base station that allocate a radio resource for a sounding signal and determine a pattern of a sounding signal, in advance. The macro base station provides a femto base station included in the system with information about the pattern of the sounding signal, and the information about the radio resource of the sounding signal. The femto base station may receive the sounding signal from the macro terminal based on the information, and thus, the femto base station may determine whether the macro terminal exists and may determine a channel between the macro terminal and the femto base station.

2 Claims, 12 Drawing Sheets

(CONVENTIONAL EXAMPLE)

(56) References Cited

U.S. PATENT DOCUMENTS

| | | |
|---|---|---|
| 2009/0052395 A1 | 2/2009 | Bae et al. |
| 2009/0098873 A1 | 4/2009 | Gogic |
| 2009/0264077 A1* | 10/2009 | Damnjanovic ............... 455/63.1 |
| 2009/0291690 A1* | 11/2009 | Guvenc et al. ................ 455/444 |
| 2010/0234040 A1* | 9/2010 | Palanki et al. ............. 455/452.2 |
| 2010/0238905 A1* | 9/2010 | Hamabe et al. ............... 370/335 |
| 2010/0323711 A1* | 12/2010 | Damnjanovic et al. ....... 455/450 |
| 2011/0255486 A1* | 10/2011 | Luo et al. ...................... 370/329 |

FOREIGN PATENT DOCUMENTS

| | | |
|---|---|---|
| KR | 10-2009-0004164 | 1/2009 |
| KR | 10-2009-0044352 | 5/2009 |
| KR | 10-2009-0045183 | 5/2009 |
| WO | WO 2009/122778 A1 | 10/2009 |

\* cited by examiner (CONVENTIONAL EXAMPLE)

(CONVENTIONAL EXAMPLE)

FIG. 3
(CONVENTIONAL EXAMPLE)
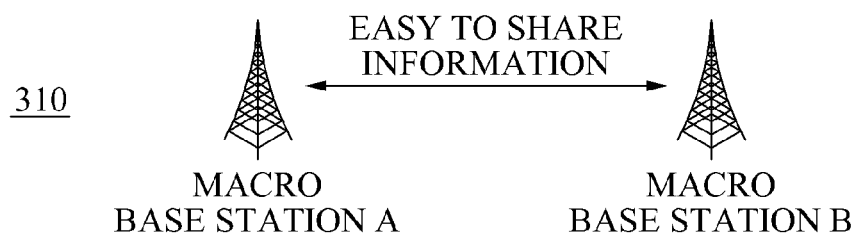
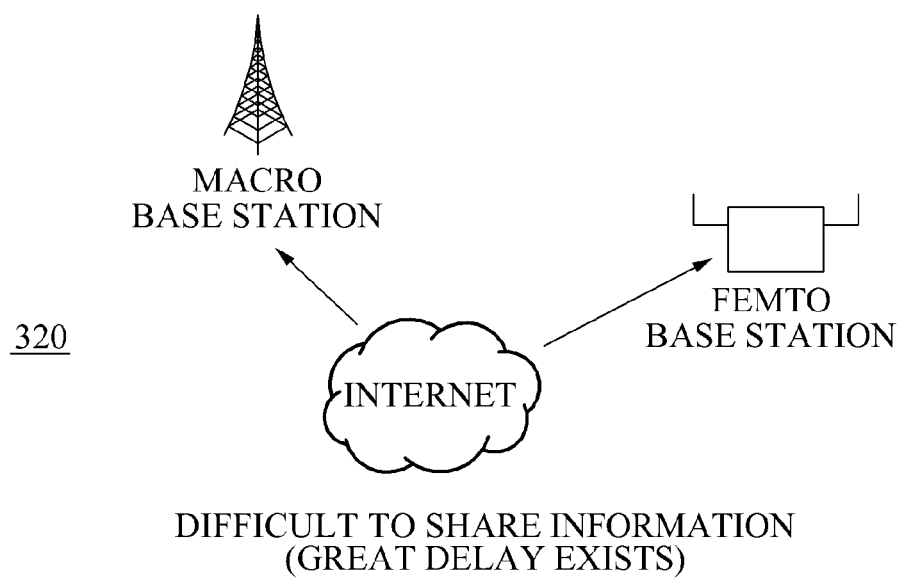

(CONVENTIONAL EXAMPLE)

FIG. 6
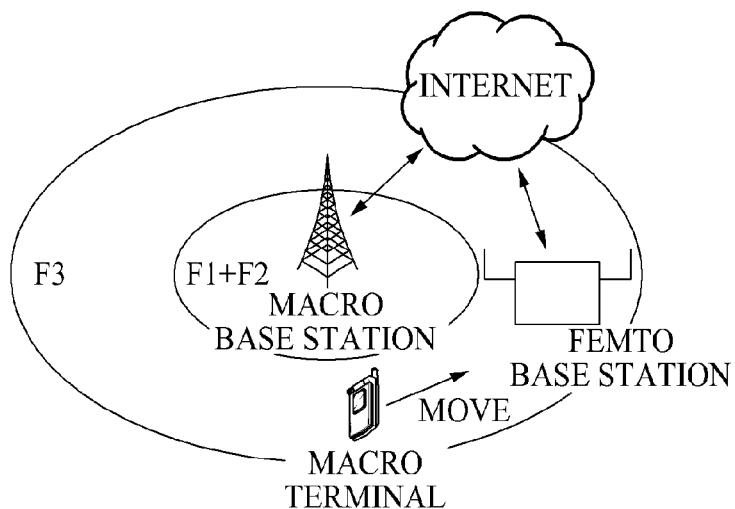
TRANSMISSION POWER OF MACRO BASE STATION
TRANSMISSION POWER OF MACRO BASE STATION
610 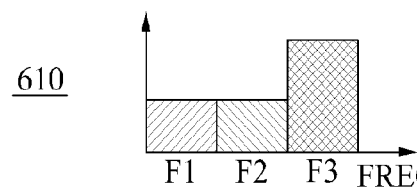 ⇒ 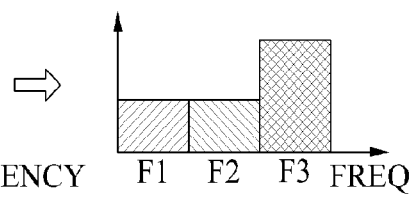
TRANSMISSION POWER OF FEMTO BASE STATION
TRANSMISSION POWER OF FEMTO BASE STATION
620 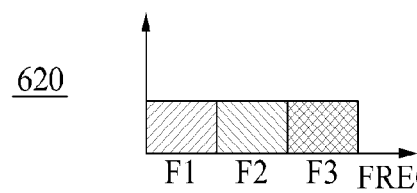 ⇒ 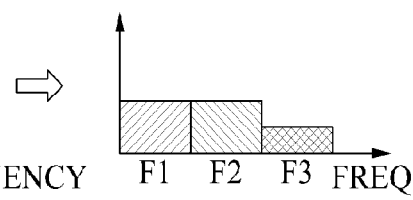

COMMUNICATION SYSTEM FOR INTER-CELL COORDINATION

CROSS-REFERENCE TO RELATED APPLICATION(S)

This application is a divisional of U.S. patent application Ser. No. 12/833,908, filed on Jul. 9, 2010, which claims the benefit under 35 U.S.C. §119(a) of Korean Patent Application No. 10-2009-0101222, filed on Oct. 23, 2009, in the Korean Intellectual Property Office, the entire disclosures of which are each incorporated herein by reference for all purposes.

BACKGROUND

1. Field

The following description relates to a hierarchical cell communication system including a femto base station and a macro base station, and more particularly, to a system where a femto base station recognizes a macro terminal or recognizes a channel between the femto base station and the macro terminal in a hierarchical cell communication system.

2. Description of the Related Art

Recently, studies have been directed towards a hierarchical cell communication system including a femtocell, a macrocell, and one or more mobile terminals. In the hierarchical cell communication system, interference from the femtocell to the macrocell can decrease the efficiency of the overall system. For example, a femtocell may interfere with a signal transmitted from the macrocell to a mobile terminal or macro terminal.

Various methods have been proposed to prevent inter-cell interference, such as coordinated beamforming and the like. However, these methods demand exchanging/sharing of channel information between cells in real-time. The exchanging/sharing of the channel information between cells in real time in the hierarchical cell communication system including the femtocell may be difficult. The femtocell is not directly connected with the macrocell, the femtocell is connected with the macrocell via a network, and thus, information transmitted/received between the femtocell and the macrocell incurs a delay.

SUMMARY

According to one general aspect, there is provided a transmission power control method of a base station, the method including receiving sounding signal information of a macro terminal from a macro base station, detecting a sounding signal transmitted by the macro terminal based on the received sounding signal information, estimating a channel between the macro terminal and the base station based on the detected sounding signal, and processing information about the estimated channel to control a transmission power of the macro base station and the base station.

The method may further include requesting the sounding signal information from the macro base station.

The method may further include transmitting, to the macro base station, an acknowledgment message indicating that the sounding signal information was received.

The detected sounding signal may indicate at least one of information identifying the macro terminal, information about a radio resource used by the macro terminal, and information about a quality of service (QoS) of the macro terminal.

The sounding signal information of the macro terminal may include at least one of information about a pattern of the sound signal, information about radio resource for the sounding signal, and information about a transmission period of the sounding signal.

The processing of the information about the estimated channel may include transmitting information about the estimated channel to the macro base station to control the transmission power of the macro base station and the base station.

The processing of the information about the estimated channel may include determining the transmission power of the base station based on the information about the estimated channel.

The method may further include receiving information about the controlled transmission power of the base station from the macro base station.

According to another general aspect, there is provided a transmission power control method of a base station, the method including receiving sounding signal information of a macro terminal from a macro base station, detecting a sounding signal transmitted by the macro terminal, based on the received sounding signal information of the macro terminal, and adjusting the transmission power of the base station based on the power of the detected sounding signal.

The adjusting may include comparing the power of the detected sounding signal with at least one comparison value, and increasing or decreasing the transmission power based on a result of the comparison.

According to another general aspect, there is provided a transmission power control method of a base station, the method including receiving sounding signal information of a macro terminal from a macro base station, detecting a sounding signal transmitted by the macro terminal based on the received sounding signal information of the macro terminal, and
performing one of estimating a channel between the macro terminal the base station based on the sound signal and generating a beamforming vector for a femto terminal based on the estimated channel, or receiving information about a channel between the macro terminal and the base station from the macro terminal in response to the detection of the sounding signal, and generating the beamforming vector for the femto terminal based on the received information about the channel.

The method may further include requesting the information about the channel between the macro terminal and the base station from the macro terminal, in response to the detection of the sounding signal.

According to another general aspect, there is provided a transmission power control method of a macro terminal, the method including receiving a request, from a macro base station, to transmit a sounding signal, and transmitting the sounding signal to a base station, wherein the sounding signal indicates at least one of information identifying the macro terminal, information about radio resource for the macro terminal, and information about a QoS of the macro terminal, and sounding signal information is provided in advance to the base station from the macro base station, the sounding signal information including at least one of information about a pattern of the sounding signal, information about radio resource for the sounding signal, and information about a transmission period of the sounding signal.

According to another general aspect, there is provided a computer-readable storage medium storing a program to control transmission power of a base station, the computer-readable storage medium comprising instructions to cause a computer to receive sounding signal information of a macro terminal from a macro base station, detect a sounding signal transmitted by the macro terminal based on the sounding signal information of the macro terminal, estimate a channel between the macro terminal and the base station based on the detected sounding signal, and process information about the estimated channel to control the transmission power of the macro base station and the base station.

According to another general aspect, there is provided a computer-readable storage medium storing a program to control transmission power of a macro terminal, the computer-readable storage medium comprising instructions to cause a computer to receive a request, from a macro base station, to transmit a sounding signal, and transmit the sounding signal to a base station, wherein the sounding signal indicates at least one of information identifying the macro terminal, information about radio resource for the macro terminal, and information about a QoS of the macro terminal, and sounding signal information is provided in advance from the macro base station to the base station, the sounding signal information including at least one of information about a pattern of the sounding signal, information about radio resource for the sounding signal, and information about a transmission period of the sounding signal.

Other features and aspects may be apparent from the following description, the drawings, and the claims.

BRIEF DESCRIPTION OF THE DRAWINGS

FIG. 3 is a diagram illustrating a conventional example of a hierarchical cell communication system having difficulty in sharing information in real time.

FIG. 6 is a diagram illustrating an example of a change in transmission power of a macro base station and a femto base station as a macro terminal moves.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

A femtocell and a femto base station described in the present specification are examples of base stations that extend the network coverage of a service provider, for example, in a home, small business, and the like. Examples described herein may be applicable to a communication system including various types of base stations, in addition to the femtocell and the femto base station. The base station may include a relay and a radio remote head (RRH) in a heterogeneous network. The base station may include a femto base station, a pico base station, a home eNode B, and the like.

Figure 1:
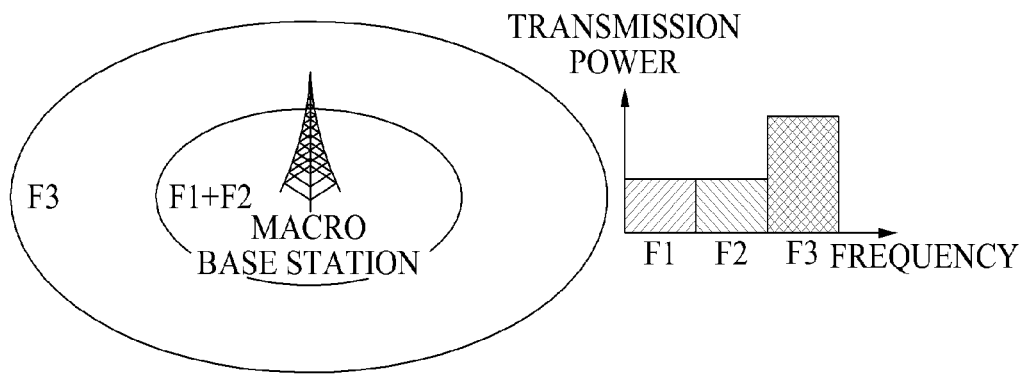
FIG. 1 is a diagram illustrating a conventional example of a macrocell communication system based on a fractional frequency reuse (FFR) scheme.

FIG. 1 illustrates a conventional example of a macrocell communication system based on a fractional frequency reuse (FFR) scheme.

Referring to FIG. 1, the macrocell communication system including a macro base station that separately manages a frequency resource, F1+F2, for an inner cell and a frequency resource, F3, for an outer cell, based on a FFR scheme. The frequency resource F1+F2 for the inner cell may be reused by an adjacent cell and the frequency resource F3 for the outer cell is not used by an adjacent cell. The FFR scheme may increase efficiency in using a radio resource by reusing the frequency resource F1+F2 for the inner cell, and also may improve a capacity of a user in the outer cell by allocating the frequency resource F3 for the outer cell to prevent interference from the adjacent cell. That is, the macro base station may allocate a higher transmission power in the frequency resource F3 for the outer cell based on the FFR scheme as illustrated in a transmission power graph of FIG. 1

When the adjacent cell of the macrocell is another macrocell, the two macrocells may share channel information in real time. However, when the adjacent cell is a femtocell, the macrocell and the femtocell may incur difficulty in sharing channel information in real time, because the femtocell is connected to the macrocell via the Internet. Also, a location of the macrocell is fixed, whereas a location of the femtocell may be freely changed. Accordingly, when the FFR scheme is used, interference from the femtocell to the macro terminal occurs. Accordingly, based on the FFR scheme, the hierarchical cell communication system including the macro cell and the femto cell will struggle to share data in real time.

Figure 2:
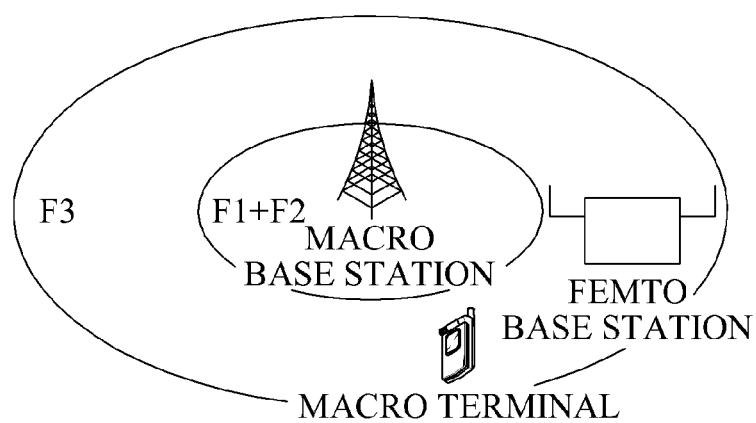
FIG. 2 is a diagram illustrating another conventional example of a hierarchical cell communication system based on a FFR scheme.

FIG. 2 illustrates another conventional example of a hierarchical cell communication system based on a FFR scheme.

Referring to the example shown in FIG. 2, the hierarchical cell communication system includes a macro base station, a macro terminal, and a femto base station. The hierarchical cell communication system uses the FFR scheme, and thus, a frequency resource F1+F2 for an inner cell and a frequency resource F3 for an outer cell are distinguished from each other.

When the macro terminal and the femto base station are far from each other, interference from the femto base station to the macro terminal is small to none. However, as the macro terminal moves closer to the femto base station, the interference increases. Also, interference may occur when a location of the femto base station is changed. Accordingly, the interference from the femto base station to the macro terminal may not be overcome with the FFR scheme.

In addition, to control interference that the femto base station may cause the macro terminal, the macro base station and the femto base station need to share information about a channel between the femto base station and the macro terminal. However, the femto base station is not directly connected with a macro base station, instead the femto base station is connected via the Internet. Thus, the femto base station is not capable of sharing information in real time. In addition, the femto base station does not always know a pattern of a signal of the macro terminal, and does not know a radio resource used for transmission of the signal of the macro terminal. Thus, the femto base station incurs difficulty in recognizing a channel between the femto base station to the macro terminal.

FIG. 3 illustrates a conventional example of a hierarchical cell communication system having difficulty sharing information in real time.

Referring to FIG. 3, multi-cell communication system 310 includes two macro base stations, a macro base station A and a macro base station B. The macro base stations may be connected via a fiber optic cable or via an X2 interface which is already well known in the art. In this example, the macro base station A and the macro base station B may have a slight delay time when they share channel information in real time.

In the example hierarchical cell communication system 320, when the macro base station is connected with the femto base station via the Internet, the macro base station and the femto base station may include a lengthy delay time when sharing the channel information. Accordingly, the hierarchical cell communication system may have difficulty in using the cooperated beamforming and the like as discussed in 3GPP LTE_advanced standard or as discussed in an IEEE 802.16m standard.

Figure 4:
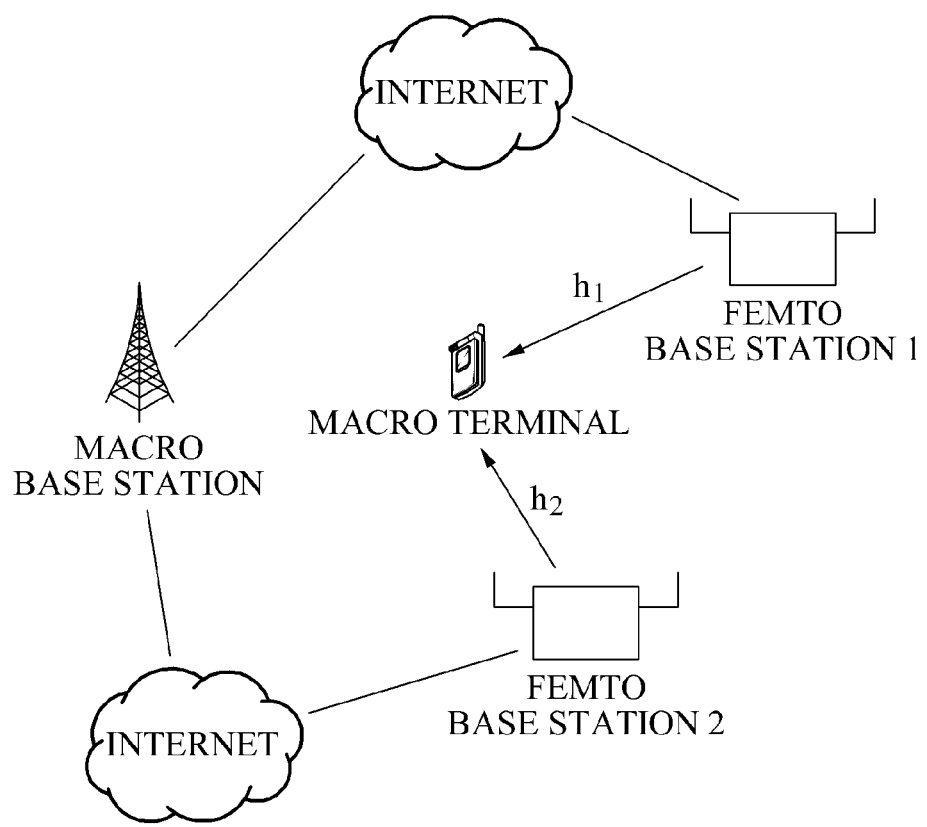
FIG. 4 is a diagram illustrating a conventional example of a hierarchical cell communication system including a plurality of femto base stations.

FIG. 4 illustrates a conventional example of a hierarchical cell communication system including a plurality of femto base stations.

Referring to the example shown in FIG. 4, when the hierarchical cell communication system includes two or more femto base stations, there is a method by which a macro terminal measures interference channels ($h_1$, $h_2$). That is, the macro terminals may perform scanning of the femto base station 1 and the femto base station 2, measure the interference channels ($h_1$, $h_2$), and report information about the interference channels to the macro base station.

However, the power of the macro terminal is limited, and a terminal may expend a great amount of power to separately measure interference channels from a plurality of femto base stations. Also, when the macro terminal reports the information about the interference channels to the macro base station, additional radio resources may be demanded.

Figure 5:
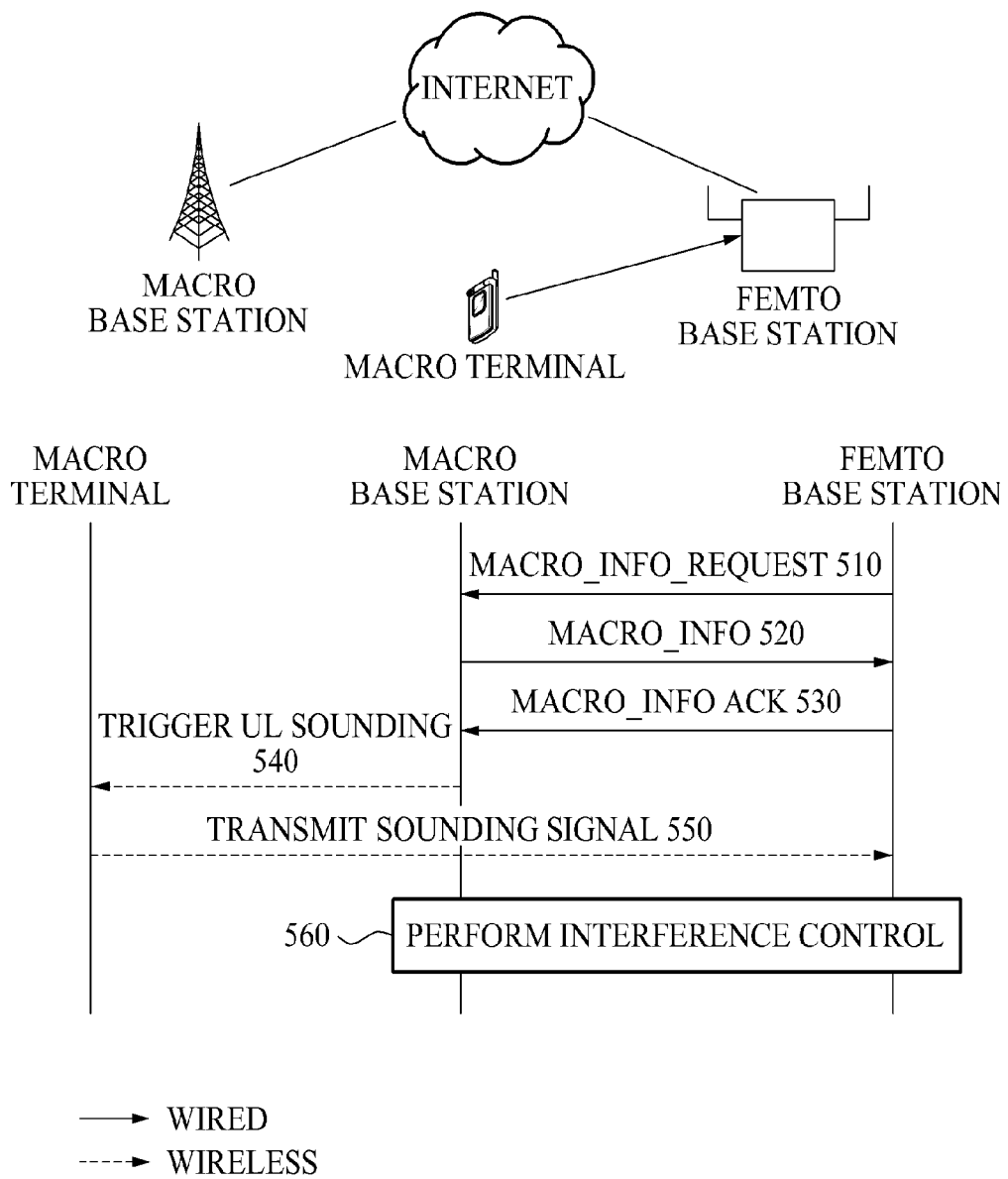
FIG. 5 is a diagram illustrating a process of an example hierarchical cell communication system.

FIG. 5 illustrates a process of an example hierarchical cell communication system.

Referring to FIG. 5, in operation 510, the femto base station transmits a "Macro_Info_Request" to a macro base station via a wired or wireless backhaul, to obtain formation related to a sounding signal of a macro terminal. In this example, the femto base station may receive information from the macro base station. The sounding signal of the macro terminal may include a signal having a predetermined pattern or a signal having a predetermined bit, and is not limited to the "sounding signal" of the 3GPP.

When the femto base station is authenticated, in operation 520, the macro base station transmits the information related to the sounding signal of the macro terminal served by the macro base station. In this example, the information related to the sounding signal of the macro terminal is transmitted from the macro base station as message "Macro_Info."

For example, the information related to the sounding signal of the macro terminal may include information about a pattern of the sounding signal, information about radio resource for the sounding signal, information about a transmission period of the sounding signal, and the like. Accordingly, the femto base station may recognize the pattern of the sounding signal transmitted from the macro terminal, the radio resource such as a frequency resource and a time resource allocated for the sounding signal, a time when the sounding signal is transmitted, and the like.

In operation 530, the femto base station transmits an acknowledgment message "Macro_Info ACK" to the macro base station in response to successful reception of the "Macro_Info." message For example, the macro base station may report to the macro terminal that the femto base station is ready to receive the sounding signal from the macro terminal through the allocated radio resource.

Also, the macro base station may wirelessly determine that the femto base station is disposed in a position capable of receiving the sounding signal from the macro terminal. In operation 540, the macro base station commands the macro terminal to transmit the sounding signal, for example, to transmit the sound signal based on at least one of a designated pattern, an allocated radio resource, a designated transmission period, and the like.

In operation 550, the macro terminal transmits the sounding signal. As mentioned above, the macro terminal may transmit the sound signal, for example, based on the designated pattern, the allocated radio resource, the designated transmission period, and the like.

As described herein, the sounding signal is a signal transmitted by the macro terminal, and may be used by a femto base station for determining, for example, whether the macro terminal exists, an amount of interference, and/or for estimating a channel between the macro terminal and the femto base station. The sounding signal may include information indicating a macro terminal, information about a radio resource for the macro terminal, information about a quality of service (QoS) of the macro terminal, and the like.

The pattern of the sounding signal may be determined differently based on, for example, an allocation pattern of the radio resource for the macro terminal and/or the QoS of the macro terminal. The femto base station may recognize the allocation pattern of the radio resource for the macro terminal and/or the QoS of the macro terminal based on the pattern of the sounding signal. In some embodiments, the sounding signal may be varied such that the femto base station may perform the described function.

The femto base station may estimate a channel between the femto base station and the macro terminal or may determine whether the macro terminal exists based on the sounding signal. For example, in a time division duplex system, the femto base station may estimate the channel from the macro terminal to the femto base station based on the sounding signal, and may recognize the channel from the femto base station to the macro terminal. Also, the femto base station may determine that the macro terminal exists based on the sounding signal. The macro base station may request feedback of information about the channel from the femto base station or the macro terminal. The feedback information may include, for example, information about a power of a signal of the femto base station that is received from the macro terminal.

Accordingly, the macro base station and the femto base station may share information about the channel between the femto base station and the macro terminal, and may perform an interference control, such as a transmission power control or a beamforming, based on the shared information. Hereinafter, a long-term dynamic spectrum management scheme, and a voluntary dynamic spectrum management scheme are described as examples of the transmission power control, and a leakage-based beamforming is described as an example of the beamforming. Also, the shared information may be used for an inter-cell handover, and the like.

FIG. 6 illustrates an example of a change in transmission power of a macro base station and a femto base station as a macro terminal moves.

Referring to FIG. 6, in this example a macro terminal gradually approaches the femto base station in an environment where a macrocell uses the FFR scheme. As shown in graphs 610 and 620, the transmission power of the macro base station is not changed, and the transmission power of the femto base station in a frequency resource F3 for an outer cell decreases.

For example, when the femto base station exists in the outer cell, the femto base station may freely use a radio resource that is not used by the macro terminal. Also, the femto base station may know a quality of a service, such as an average signal to noise plus interference ratio (SINR), demanded by the macro terminal, and may restrictively use a radio resource used by the macro terminal based on a long-term channel gain, such as a path loss or shadowing, based on the assumption that the quality of the service is guaranteed.

When the femto base station determines that the macro terminal is not present, the femto base station may use all possible radio resource from the macro base station. Also, when the femto base station determines that the macro terminal is present, the femto base station may effectively use the radio resource such that the macro terminal may perform communication without interference from the femto base station.

Figure 7:
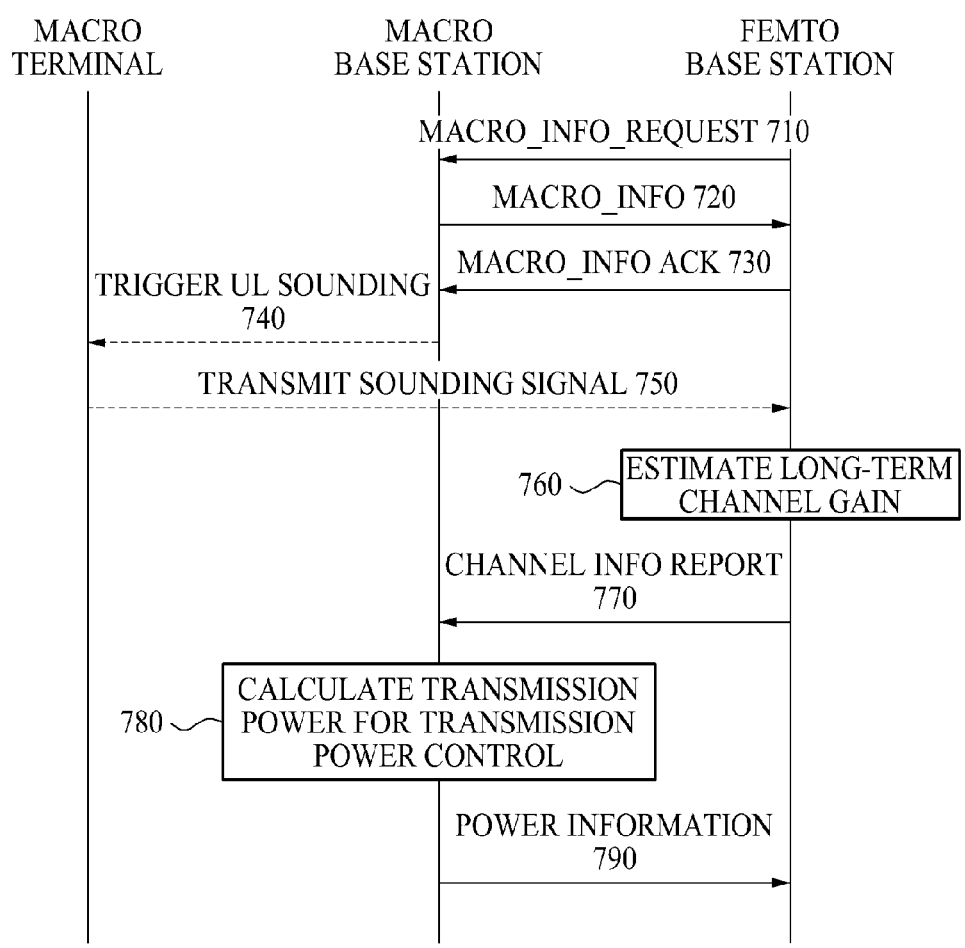
FIG. 7 is a diagram illustrating a process of an example hierarchical cell communication system that applies a long-term dynamic spectrum management scheme.

FIG. 7 illustrates a process of an example hierarchical cell communication system that applies a long-term dynamic spectrum management (DSM) scheme.

Referring to FIG. 7, in operation 710, a femto base station transmits a "Macro_Info_Request" to a macro base station via a backhaul to obtain information related to a sounding signal of a macro terminal.

In some embodiments, the femto base station and the macro base station may perform an authentication process. The macro base station may store and update sounding signal information of the macro terminals stored by the macro base station. When the femto base station is authenticated, in operation 720, the macro base station transmits information related to the sounding signal of the macro terminal to the femto base station. In this example, the information related to the sounding signal of the macro terminal is transmitted in a form of a message, "Macro_Info."

In operation 730, the femto base station transmits an acknowledgment message "Macro_Info ACK" to the macro base station in response to successful reception of the "Macro_Info" message.

For example, the macro base station may report, to the macro terminal, that the femto base station is ready to receive a sounding signal from the macro terminal through an allocated radio resource.

In operation 740, the macro base station determines that the macro terminal is within signaling distance of the femto base station. That is, the macro base station determines that the femto base station is capable of receiving the sounding signal from the macro terminal. The macro base station commands the macro terminal to transmit the sounding signal based on, for example, a designated pattern, allocated radio resource, a designated transmission period, and the like.

In operation 750, the macro terminal transmits the sounding signal based on, for example, the designated pattern, the allocated radio resource, the designated transmission period, and the like.

In operation 760, the femto base station estimates or predicts a channel from the femto base station to the macro terminal.

The femto base station may estimate a long-term channel gain from the macro terminal to the femto base station, and thus, a long term channel gain from the femto base station to the macro terminal may be predicted. For example, in a time division duplex (TDD) system, when a channel reciprocity is established, the channel gain from the macro terminal to the femto base station may be estimated as the channel gain from the femto base station to the macro terminal.

For example, where the macro terminal frequently transmits the sounding signal, the femto base station may estimate a long-term channel gain by averaging measured channel gains. For example, where the macro terminal does not frequently transmit the sounding signal, the femto base station may estimate the long-term channel gain by adding an appropriate fading margin to the measured channel gains.

In operation 770, the femto base station transmits, to the macro base station, the obtained long-term channel gain in a form of a message, "Channel Info Report." The femto base station may use a wired backbone or a wireless backbone to transmit the long-term channel gain.

In operation 780, the macro base station calculates a transmission power of each of femto base stations and a transmission power of each frequency resource (sub band) according to a transmission power control, based on the long-term channel gain. In operation 790, information about the calculated transmission power is transmitted to each of the femto base stations.

Unlike the diagram of FIG. 7, in some embodiments the transmission power may be calculated by the femto base station, instead of the macro base station. The femto base station may transmit the calculated transmission power to another femto base station and/or the macro base station.

The transmission power control may be based on the long-term channel gain and information that is generally available in the macro base station. The transmission power control may be performed based on the following algorithm.

$$\Gamma_{m,i}^{o} = \frac{G_{m,i} p_{m,i}}{\sigma_i^2 + \sum_{j=1}^{F} G_{f,i,j} p_{f,j}}$$

$$\frac{G_{m,i} p_{m,i}}{\sigma_i^2 + \sum_{j=1}^{F} G_{f,i,j}(p_{f,j} + \Delta p_{f,j})} \geq \Gamma_{m,i}^{t}.$$

In this example, $p_{f,j}$ represents a current transmission power of a femto base station j, $p_{m,i}$ represents a current transmission power of a macro base station to a macro terminal I, $\Delta p_{f,j}$ represents a transmission power change of femto base station j, $G_{f,i,j}$ represents a channel gain from a femto base station j to a macro terminal i, $G_{m,i}$ represents a channel gain from a macro base station to a macro terminal i, $\Gamma_{m,i}^{o}$ represents a long-term SINR of a macro terminal i, $\Gamma_{m,i}^{t}$ represents a long-term target SINR of a macro terminal i, and $\sigma_i^2$ represents a background noise of macro terminal i.

Furthermore, $$A = \begin{bmatrix} \frac{G_{f,11}}{G_{m,1}p_{m,1}} & \cdots & \frac{G_{f,1f}}{G_{m,1}p_{m,1}} \\ \vdots & \ddots & \vdots \\ \frac{G_{f,M1}}{G_{m,M}p_{m,M}} & \cdots & \frac{G_{f,MF}}{G_{m,M}p_{m,M}} \end{bmatrix}, x = [\Delta p_{f,1} \cdots \Delta p_{f,F}]'$$

$$b_t = \left[ \frac{1}{\Gamma_{m,1}^t} \cdots \frac{1}{\Gamma_{m,M}^t} \right]', b_o = \left[ \frac{1}{\Gamma_{m,1}^o} \cdots \frac{1}{\Gamma_{m,M}^o} \right]^t,$$

$$Ax = b_t - b_o,$$

and $G_{f,ij}$ is reported to the macro base station, after the femto base station measures a sounding signal of the macro terminal.

In some embodiments, the number of femto base stations is greater than the number of macro terminals.

When the number of femto base stations is greater than the number of macro terminals, the algorithm considers minimizing the change of a transmission power 'x' of the femto base station, and considers the satisfaction of a target long-term SINR as a constraint. For example, the algorithm may be expressed as given below.

$$\min\|x\|$$

$$s.t. Ax = b_t - b_o, \text{ and}$$

$$x_o = A^H(AA^H)^{-1}(b_t - b_o)$$

In some embodiments, the number of femto base stations may be less than or equal to the number of macro terminals.

When the number of femto base stations is less than or equal to the number of macro terminals, the algorithm considers minimizing the deterioration of the efficiency of macro terminals. For example, the algorithm may be expressed as given below.

$$\min\|b_t - b_o - Ax\|^2, \text{ and } x_o = (A^H A)^{-1} A^H (b_t - b_o)$$

Based on a long-term DSM, the macro base station and the femto base station exchange related information with each other to perform transmission power control. Also, according to a voluntary DSM, one or more of the macro base station and the femto base station may voluntarily control its own transmission power.

Figure 8:
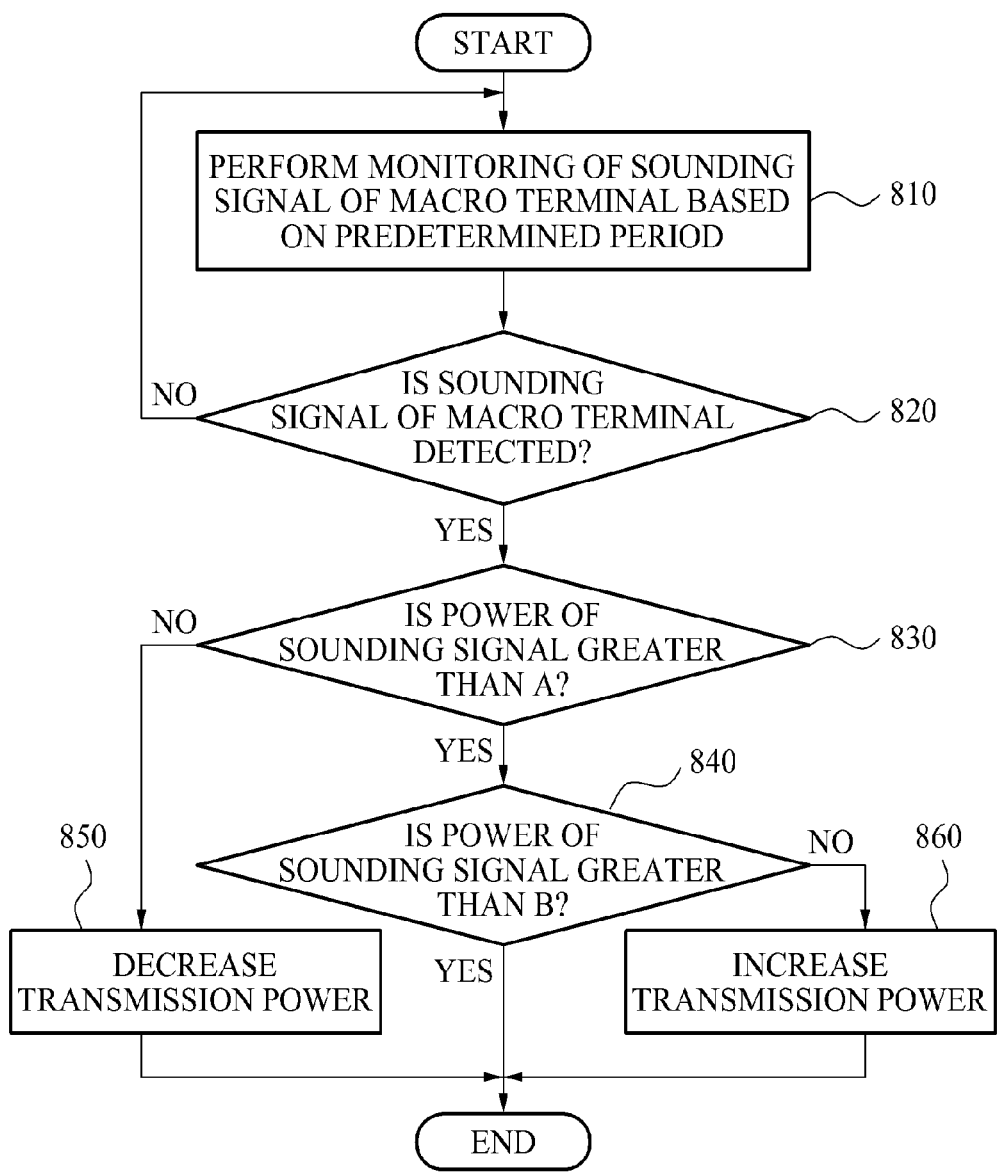
FIG. 8 is a flowchart illustrating an example of a method of a femto base station in a hierarchical cell communication system that applies a voluntary dynamic spectrum management scheme.

FIG. 8 illustrates an example of a method of a femto base station in a hierarchical cell communication system that applies a voluntary DSM scheme.

Referring to FIG. 8, in operation 810, the femto base station performs monitoring of a sounding signal of a macro terminal based on a predetermined period, for example, a transmission period.

In operation 820, the femto base station determines whether the sounding signal of the macro terminal is detected.

When the sounding signal of the macro terminal is not detected, 810 is performed again. If the sounding signal of the macro terminal is detected, in operation 830, the femto base station determines whether a power (long-term gain) of the detected sounding signal is greater than α. When the power of the detected sounding signal is greater than a, it is determined that the interference between the macro terminal and the femto base station is above a preset threshold, and thus, a transmission power of the femto base station is reduced in operation 850. Conversely, when the power of the detected sounding signal is less than or equal to α, in operation 840, the femto base station determines whether the power of the detected sounding signal is less than β. In this example, β is a real number that is less than α.

When the power of the detected sounding signal is less than β, interference between the femto base station and the macro terminal is determined to be below a preset threshold, and in operation 860, the femto base station increases transmission power. In this example, an increase or decrease of the transmission power indicates an increase or decrease of a transmission power in a frequency band used by the macro terminal.

Figure 9:
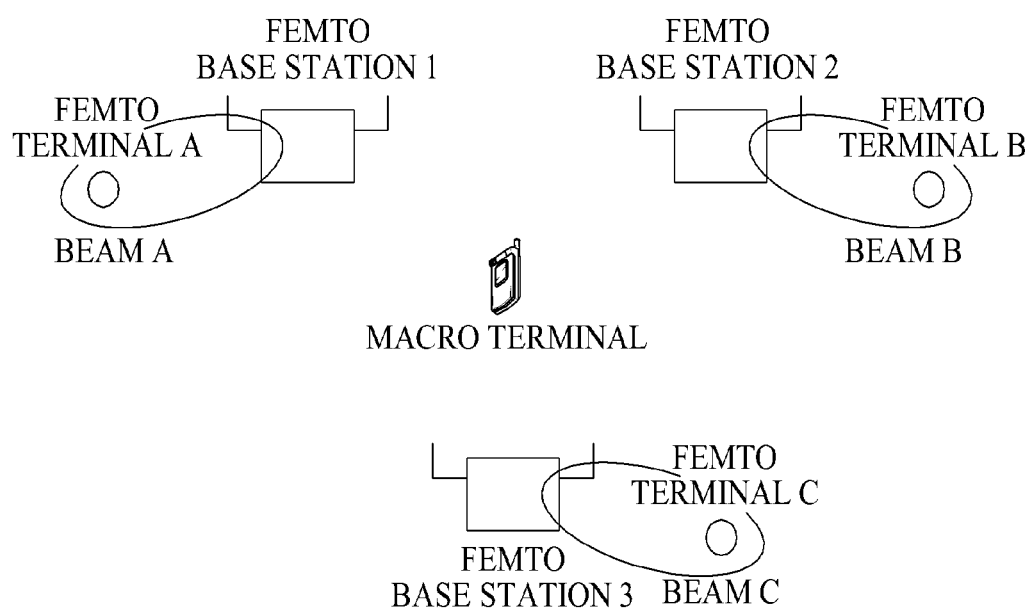
FIG. 9 is a diagram illustrating an example of leakage-based beamforming

A voluntary DSM and a long-term DSM are based on a long-term channel gain. FIG. 9 illustrates an example in which interference control is based on a short-term channel gain, such as a multi-path fading.

When the macro terminal transmits a sounding signal, the femto base station may estimate a channel between the femto base station and the macro terminal. Also, when there are a plurality of femto base stations, each of the femto base stations may allocate its own radio resource based on the macro base station, in comparison to the example where the macro base station allocates radio resource to each of the femto base stations.

FIG. 9 illustrates an example of leakage-based beamforming

Referring to FIG. 9, the femto base stations 1-3, respectively, form beams A, B, and C for femto terminals A, B, and C. In this example, the beams A, B, and C are formed such that they do not generate interference for the macro terminal. In such a scheme, each of the femto base stations 1-3 may use a radio resource that is also used by the macro terminal, without causing interference.

Each of the femto base stations 1, 2, and 3 may generate a leakage-based beam forming vector based on the following Equations:

$$\max \frac{\|H_{f,kj} w_{f,j}\|^2}{M_{f,kj}\sigma^2 + \sum_{i=1}^{M} \|H_{m,ij} w_{f,j}\|^2}$$

$$\text{s.t. } \|w_{f,j}\|^2 = 1, w_{f,j} \in C^{N_{f,j} \times 1}, \text{ and}$$

$$w_{f,j}^o = \max \text{ eigenvector}\left((M_{f,kj}\sigma_{f,kj}^2 I + \tilde{H}_{f,kj}^* \tilde{H}_{f,kj})^{-1} H_{f,kj}^* H_{f,kj}\right)$$

$$\text{where } \tilde{H}_{f,kj} = [H_{m,1j} \cdots H_{m,Mj}]^T.$$

In this example, $N_{f,j}$ represents a number of transmission antennas of a femto base station in a femtocell j, $M_{f,kj}$ represents a number of reception antennas of femto terminal k in a femtocell j, $M_{m,i}$ represents a number of reception antennas of a macro terminal i, $H_{f,kj}$ represents a channel matrix from a femto base station j to a femto terminal k, and having a dimension of $M_{f,kj}$ by $N_{f,j}$, $H_{m,ij}$ represents a channel matrix from a femto base station j to a macro terminal i, and having a dimension of $M_{m,i}$ by $N_{f,j}$, $w_{f,kj}$ represents a beamforming vector of a femto base station j for a femto terminal k, and $\sigma_{f,kj}^2$ represents a background noise power of a femto terminal k in a femto cell j.

Figure 10:
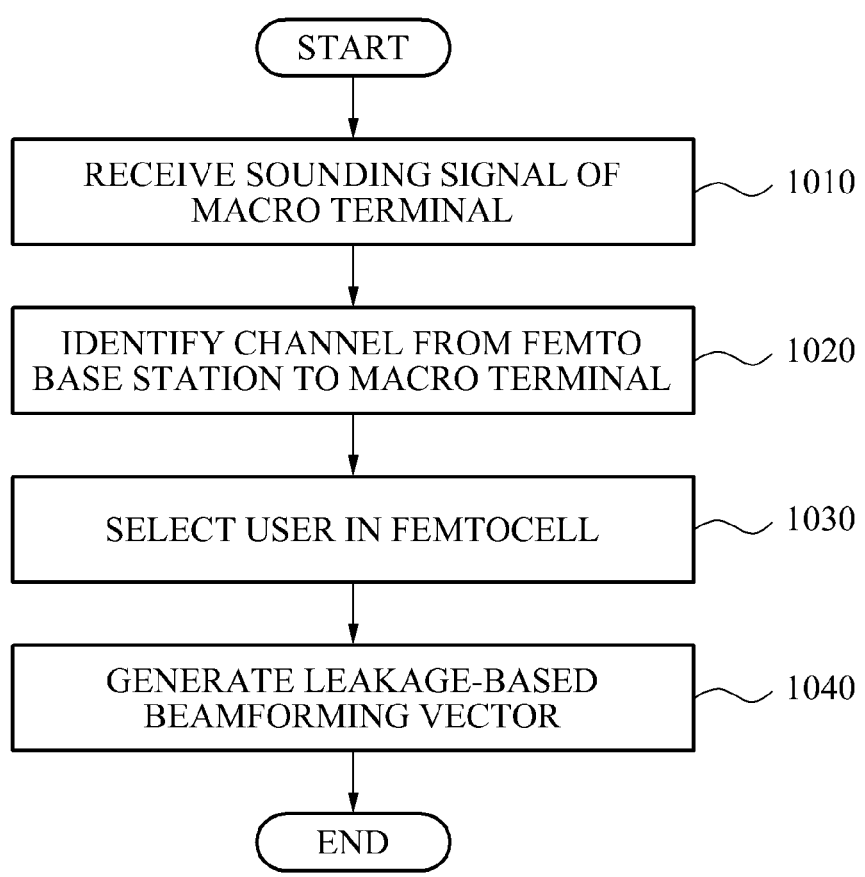
FIG. 10 is a flowchart illustrating an example of a method of femto base station in a hierarchical cell communication system that applies leakage-based beamforming

FIG. 10 illustrates an example of a method of femto base station in a hierarchical cell communication system that applies leakage-based beamforming Referring to FIG. 10, in operation 1010, the femto base station receives a sounding signal of a macro terminal. The sounding signal may include channel information. In operation 1020, the femto base station may estimate a channel from the femto base station to the macro terminal, for example, a short-term channel gain. In operation 1020, the femto base station may determine a channel between the femto base station and the macro terminal, based on the information reported from the macro terminal.

In operation 1030, the femto base station selects at least one user (femto terminal) that is intended to be served, by using one or more user selection algorithms. For example, the femto base station may use a proportional fairness scheduling scheme.

In operation 1040, the femto bases station generates a leakage-based beamforming vector based on the above Equations.

Figure 11:
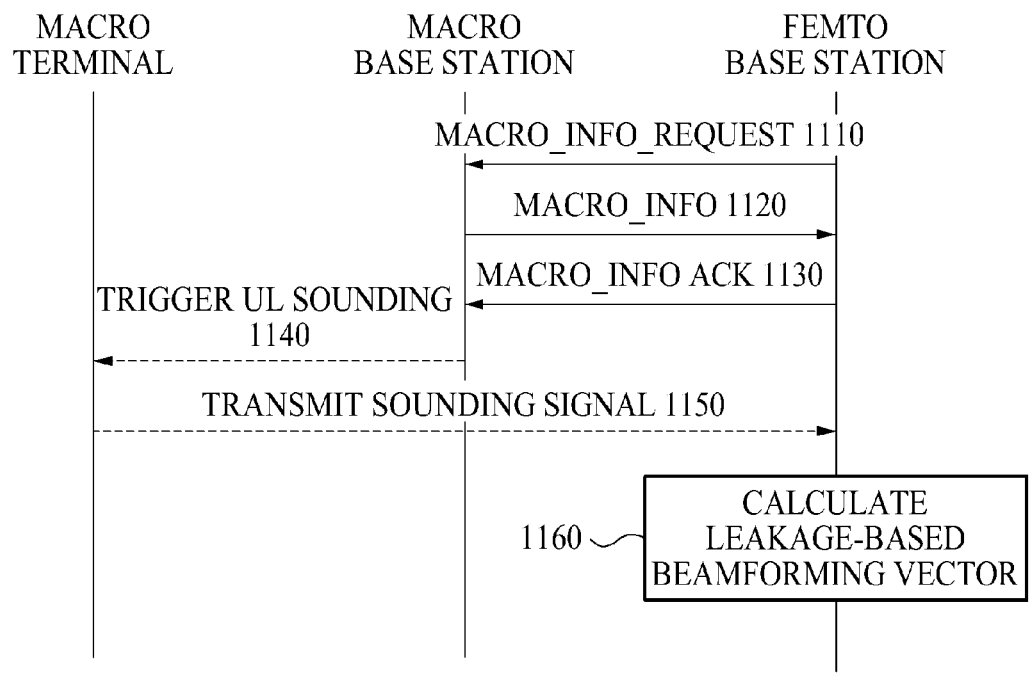
FIG. 11 is a diagram illustrating a process of an example hierarchical cell communication system that applies leakage-based beamforming

FIG. 11 illustrates a process of an example hierarchical cell communication system that applies leakage-based beamforming Referring to FIG. 11, in operation 1110, the femto base station transmits a "Macro_Info_Request" to the macro base station via a backhaul to request information related to a sounding signal of the macro terminal.

In operation 1120, the macro base station transmits, to the femto base station, information related to the sounding signal of the macro terminal that is served by the macro base station.

In operation 1130, the femto base station transmits an acknowledgment message "Macro_Info ACK" to the macro base station in response to successful reception of a message "Macro_Info."

In operation 1140, the macro base station wirelessly determines that the femto base station is capable of receiving a sounding signal from the macro terminal, and commands the macro terminal to transmit the sounding signal. For example, the macro base station may command the macro terminal to transmit the sounding signal based on a designated pattern, allocated radio resource, a designated transmission period, and the like.

In operation 1150, the macro terminal transmits the sounding signal as commanded by the macro base station.

In operation 1160, the femto base station estimates a channel from the femto base station to the macro terminal. For example, the femto base station may estimate a channel including a short-term channel gain, based on the received sounding signal.

Unlike the diagram of FIG. 11, when a channel reciprocity is not established, information about a channel from the femto base station to the macro terminal may be provided to the femto base station from the macro terminal. This is further described with reference to FIG. 12.

Figure 12:
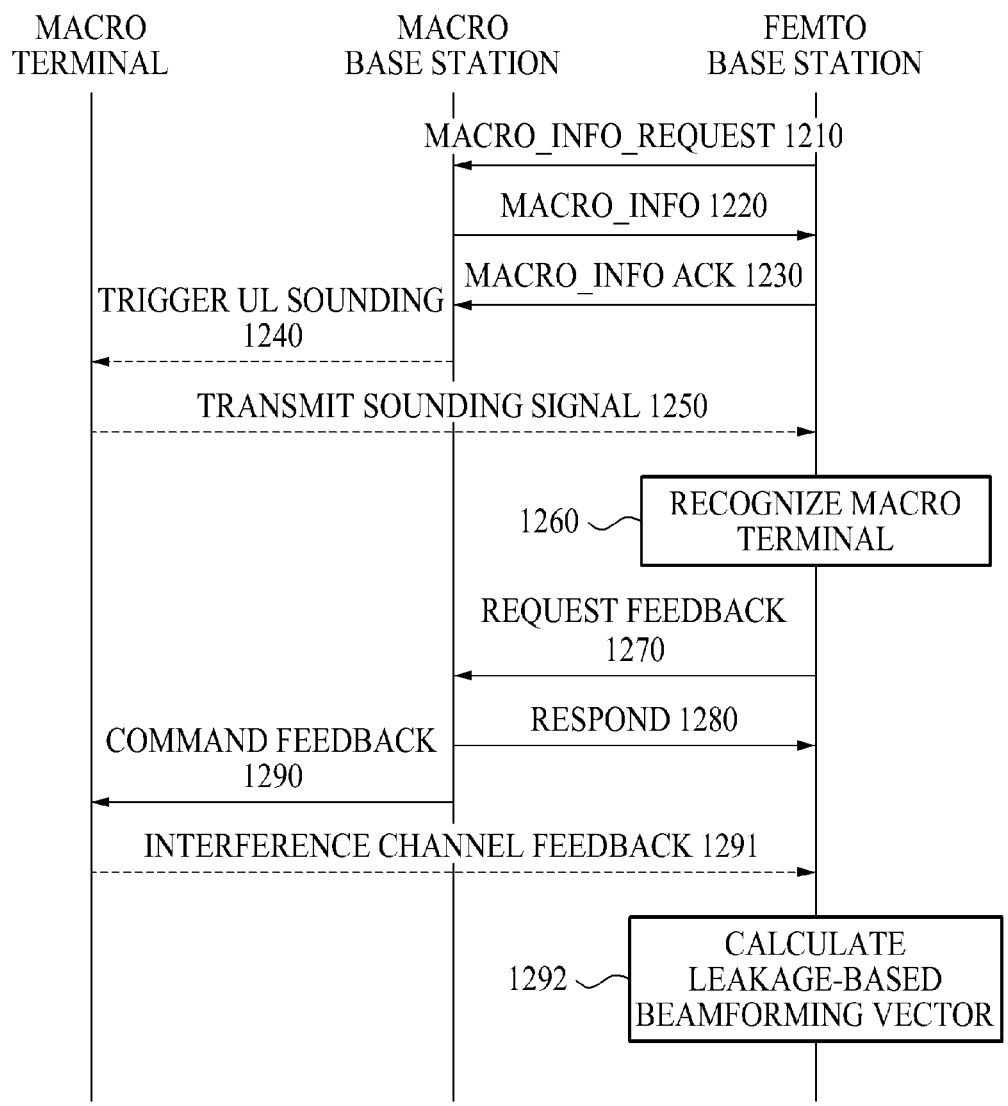
FIG. 12 is a diagram illustrating another process of an example hierarchical cell communication system that applies leakage-based beamforming Throughout the drawings and the detailed description, unless otherwise described, the same drawing reference numerals should be understood to refer to the same elements, to features, and structures. The relative size and depiction of these elements may be exaggerated for clarity, illustration, and convenience.

FIG. 12 illustrates another process of an example hierarchical cell communication system that applies leakage-based beamforming Referring to FIG. 12, operations 1210 through 1250 are performed in the same manner as operations 1110 through 1150 of FIG. 11. Thus, a description of these operations is omitted.

After operations 1210 through 1250 are performed, in operation 1260, the femto base station recognizes whether the macro terminal exists, and also recognizes an effect that the macro terminal has on the femto base station.

In operation 1270, femto base station requests, from a macro base station, information about a channel between the femto base station and the macro terminal, and the macro base station responds to the request in operation 1280. In operation 1290, the macro base station commands the macro terminal to feed back, to the femto base station, the information about the channel between the femto base station and the macro terminal. In operation 1291, the macro terminal feeds back, to the femto base station, the information about the channel between the femto base station and the macro terminal. In some embodiments, an initialization operation for communication between the macro terminal and the femto base station is selectively operated.

In operation 1292, when the information about the channel from the femto base station to the macro terminal is provided to the femto base station, the femto base station generates an appropriate leakage-based beamforming vector.

According to example embodiments, the macro base station provides a femto base station with information about a pattern of a sounding signal, information about radio resource for the sounding signal, and the like, and thus, the femto base station is capable of receiving the sounding signal transmitted from a macro terminal. Accordingly, the femto base station may estimate a channel between the macro terminal and the femto base station or may recognize an existence of the macro terminal, and may reduce interference between of data sent from a macro base station to the macro terminal.

The system described herein provides a solution to the problems caused by the interference from the femtocell to the macrocell, particularly, interference from the femto base station to the macro terminal, and may share channel information between the femtocell and the macrocell in real time.

As a non-exhaustive illustration only, a terminal or a terminal device described herein may refer to mobile devices such as a cellular phone, a personal digital assistant (PDA), a digital camera, a portable game console, and an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission power control method of a base station, the method comprising:
   receiving sounding signal information of a macro terminal from a macro base station;
   detecting a sounding signal transmitted by the macro terminal based on the received sounding signal information of the macro terminal; and
   performing one of:
   estimating a channel between the macro terminal and the base station based on the sounding signal and generating a beamforming vector for a femto terminal based on the estimated channel; or
   receiving information about a channel between the macro terminal and the base station from the macro terminal in response to the detection of the sounding signal, and generating the beamforming vector for the femto terminal based on the received information about the channel.

2. The method of claim 1, further comprising requesting the information about the channel between the macro terminal and the base station from the macro terminal, in response to the detection of the sounding signal.

* * * * *